United States Patent
Suh et al.

(10) Patent No.: US 6,540,941 B2
(45) Date of Patent: Apr. 1, 2003

(54) GREEN PHOSPHOR FOR FLUORESCENT DISPLAY AND METHOD OF MANUFACTURING THE SAME

(75) Inventors: Kyung Soo Suh, Taejon (KR); Seung Youl Kang, Taejon (KR); Jin Ho Lee, Chungju (KR); Kyoung Ik Cho, Taejon (KR); Ick Kyu Choi, Seoul (KR); Yong Jei Lee, Seoul (KR); Jae Dong Byun, Seoul (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/775,947

(22) Filed: Feb. 2, 2001

(65) Prior Publication Data

US 2002/0060312 A1 May 23, 2002

(30) Foreign Application Priority Data

Sep. 28, 2000 (KR) ......................... 2000-56925

(51) Int. Cl.⁷ .................. C09K 11/54; C09K 11/62; C09K 11/64
(52) U.S. Cl. .............................. 252/301.6 R
(58) Field of Search .................... 252/301.6 R

(56) References Cited

U.S. PATENT DOCUMENTS 3,723,339 A * 3/1973 Wanmaker et al. ... 252/301.4 R
5,520,847 A * 5/1996 Satoh et al. ............... 106/425

FOREIGN PATENT DOCUMENTS

| KR | 2000-1988 | 1/2000 |
| KR | 2000-18337 | 4/2000 |
| WO | WO 97/25276 | 7/1997 |

* cited by examiner

Primary Examiner—C. Melissa Koslow
(74) Attorney, Agent, or Firm—Seed IP Law Group PLLC

(57) ABSTRACT

The present invention provides a green phosphor for fluorescent display having a composition represented by a chemical formula: $xZnO+(2-x-y/2)Ga_2O_3+yAl_2O_3:zMn^{2+}$ where $0.8 \leq x < 1.0$; $0 < y \leq 0.8$, and $0 < z \leq 0.1$, wherein a part of gallium in nonstoichiometric zinc gallate base is substituted for aluminum and $Mn^{2+}$ is added to the zinc gallate base. Also, the present invention provides a method of manufacturing said green phosphor for fluorescent display, the method comprising steps of: preparing a mixture by mixing uniformly zinc oxide, gallium oxide, aluminum oxide, alcohol and either an aqueous solution of manganese salt or an aqueous suspension of manganese oxide; preparing a compound by heating said mixture; and reducing said compound by re-heating said compound in a reducing atmosphere.

5 Claims, 5 Drawing Sheets

US 6,540,941 B2

GREEN PHOSPHOR FOR FLUORESCENT DISPLAY AND METHOD OF MANUFACTURING THE SAME

TECHNICAL FIELD

The present invention relates to a green phosphor for fluorescent display and a method of manufacturing the same. Specifically, the present invention relates to a $ZnGa_2O_4$ based green phosphor for fluorescent display having high luminous efficiency and high color purity and a method of manufacturing the same.

BACKGROUND OF THE INVENTION

A fluorescent display, specifically a field emission display (FED) is a flat panel display working by the same principle with the Braun tube, in which a cathode plate which is a field emission element array panel discharging electron by electric field in place of heat and an anode plate which is a fluorescent panel receiving electrons and emitting light are disposed parallel to each other at a predetermined distance packaged under high vacuum. Sulfide-based phosphors having high luminous efficiency have been generally used in the conventional Braun tube. However, the distance between the cathode plate and the anode plate in the field emission display is small, so that high voltage more over 10 kV such as used in Braun tube causes arcing. Therefore, a low voltage not more than 5 kV is required for the field emission display. Specifically, FED operating with voltage not more than 1 kV has been studied for development all over the world.

When energies of electrons are equal to or lower than 1 kV, the electron penetrating depth is estimated less then 20 nm from a phosphor surface. Therefore, there is a problem that the luminous efficiency and the luminance of the phosphor for FED operating at low voltage are much lower than those of the conventional Braun tube. Also, there is a problem that a surface state of the phosphor greatly influences the luminous efficiency of the phosphor.

Specifically, if the sulfide-based green phosphor, ZnS: Cu, Al, widely used in the conventional Braun tube is used as a phosphor for FED, not only the luminous efficiency are very low at low operating voltage, but also a small amount of sulfur is liberated from the sulfide-based phosphor by irradiating an electron beam during a long time. There is another problem that in an FED panel having a distance of about 1 mm between the cathode plate and the anode plate, an internal space under vacuum between the cathode plate and the anode plate is small and, vacuum level is by liberated sulfur. The degradation of ZnS phosphor during operation will also lead to poisoning of the field emission cathode tips, so that performance of the display is deteriorated. Recently, in order to solve such problems, oxide-based phosphors which have no such problems have been widely studied.

SUMMARY OF THE INVENTION

Therefore, the present invention is made in order to solve the conventional problems described above.

An object of the present invention is to provide oxide-based green phosphor for fluorescent display not causing degradation of sulfur during operation but having a high luminous efficiency and high color purity.

Another object of the present invention is to provide a method of manufacturing the green phosphor for fluorescent display in simple and economic manners. The above objects can be accomplished by a green phosphor for fluorescent display having a composition represented by a chemical formula:

$$xZnO+(2-x-y/2)Ga_2O_3+yAl_2O_3{:}zMn^{2+}$$

where $0.8 \leq x < 1.0$; $0 < y \leq 0.8$, and $0 < z \leq 0.1$, wherein a part of gallium in nonstoichiometric zinc gallate base is substituted for aluminum and $Mn^{2+}$ is added to the zinc gallate base.

Also, in order to accomplish the above objects, a method of manufacturing a green phosphor for fluorescent display having a composition represented by a chemical formula:

$$xZnO+(2-x-y/2)Ga_2O_3+yAl_2O_3{:}zMn^{2+}$$

where $0.8 \leq x < 1.0$; $0 < y \leq 0.8$, and $0 < z \leq 0.1$, is provided. The method includes the following steps: A first step is of preparing a mixture by mixing uniformly zinc oxide, gallium oxide, aluminum oxide, alcohol and either an aqueous solution of manganese salt or an aqueous suspension of manganese oxide. A second step is of preparing a compound by heating said mixture. And a third step is of reducing said compound by re-heating said compound in a reducing atmosphere.

It is preferable that ZnO is used as said zinc oxide, $Ga_2O_3$ is used as said gallium oxide, $Al_2O_3$ is used as said aluminum oxide, MnO or $MnO_2$ is used as said manganese oxide, and $MnCl_2$ is used as said manganese salt.

Also, it is preferable that said step of preparing a compound is performed by heating said mixture at a temperature of 1000° C. to 1300° C. for 4 to 10 hours, and said step of reducing said compound is performed by re-heating said compound in the reducing atmosphere in which a volume ratio of nitrogen and hydrogen is within a range of 100%:0% to 80%:20%, at a temperature of 900° C. to 1000° C. for 0.5 to 5 hours.

Also, it is still preferable that in said step of preparing a mixture, said mixture has an element ratio of zinc and gallium smaller than 1:2 and 0.05 to 0.15 m/o of $Mn^{2+}$, said step of preparing a compound is performed by heating said mixture at a temperature of 1100° C. to 1300° C. for not more than 10 hours, and said step of reducing said compound is performed by re-heating said compound in the reducing atmosphere in which a volume ratio of nitrogen and hydrogen is not more than 100:5, at a temperature of 900° C. to 1000° C. for about 3 hours.

Luminescence characteristics of Zinc gallate based phosphor can be maximized by optimizing surface compositions, diameters and shapes of the phosphor powders.

BRIEF DESCRIPTION OF THE DRAWINGS

The embodiments of the present invention will be explained with reference to the accompanying drawings, in which.

DETAILED DESCRIPTION OF THE INVENTION

Figure 1:
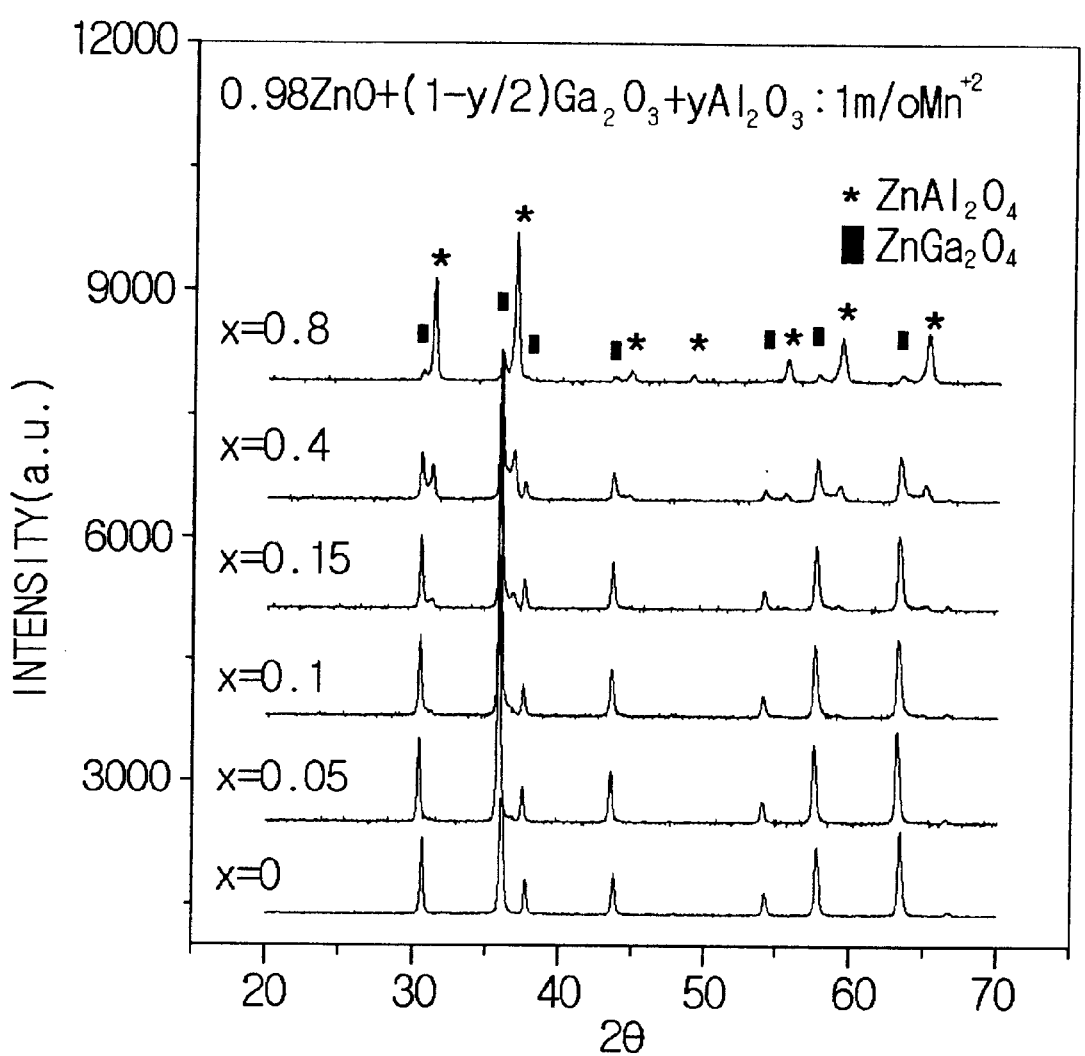
FIG. 1 is a graph illustrating change of X ray diffraction pattern in response to change of y value in a phosphor having a composition of $0.98ZnO+(1.02-y/2)Ga_2O_3+yAl_2O_3{:}1$ m/o $Mn^{2+}$.

The above objects, other objects, features and advantages of the present invention will be better understood from the following description taken in conjunction with the attached drawings.

According to the present invention, a green phosphor for fluorescent display having high luminous efficiency and high color purity at low voltage and having oxide-based materials which was not contained sulfur.

The phosphor for fluorescent display according to the present invention has a composition represented by a chemical formula: $xZnO+(2-x-y/2)Ga_2O_3+yAl_2O_3$:$zMn^{2+}$ where $0.8 \leq x < 1.0$; $0 < y \leq 0.8$, and $0 < z \leq 0.1$. A part of gallium, trivalent metal, in nonstoichiometric zinc gallate base is substituted for aluminum, trivalent metal, and $Mn^{2+}$, a transition metal, is added to the zinc gallate base.

Also, according to the present invention, a method of simply and economically manufacturing the above green phosphor for fluorescent display is provided.

In the method, first, a mixture is prepared by mixing uniformly zinc oxide of x mole, gallium oxide of 2−x−y/2 mole, aluminum oxide of y mole, alcohol and either an aqueous solution of manganese salt or manganese oxide and drying the mixed materials. At that time, x value is within a range of 0.8 to 1.2 mole. When x value is out of the range, a phase according to the present invention cannot be obtained. It is more preferable that x value is 0.8 to 1.0 mole. The y value is within a range of $0 < y \leq 0.8$ mole. When y value is more over 0.8 mole, $ZnAl_2O_4$ phase in place of $ZnGa_2O_4$ phase is predominently produced, thereby decreasing luminance. The z value is within a range of $0 < z \leq 0.1$ mole. When z value is more than 0.1 mole, luminance is decreased due to concentration quenching. In used quantity of the elements, it is preferable that the element ratio of zinc and gallium is less than 1:2, that the y value of aluminum is within a range of 0.1 to 0.3, and that additional quantity of $Mn^{2+}$ is within a range of 0.005 to 0.15 m/o. At that time, it is preferable that the zinc oxide is ZnO, the gallium oxide is $Ga_2O_3$, the aluminum oxide is $Al_2O_3$, the manganese oxide is MnO or $MnO_2$, and the manganese salt is $MnCl_2$. Specifically, the aluminum oxide is substituted for the gallium oxide, so that the crystal field is changed and the luminance is changed. The above solvent is alcohol as in the conventional case. Then, the step of preparing the mixture is completed.

Now, the step of preparing a compound will be explained. The above mixture is heated at a temperature of 1000° C. to 1300° C. for 4 to 10 hours to produce the compound. At temperature less than 1000° C., crystal characteristic of the compound is decreased, and at temperature more than 1300° C., luminance is decreased due to volatilization of zinc. In general, it is preferable that, at low temperature, heating is performed for a long time and at a high temperature, heating is performed for a short time. The compound is finely powdered for use in the next step, as in the conventional case.

Next, the step of reducing the compound will be explained. The fine powder of the compound is re-heated at temperature of 800° C. to 1000° C. for 0.5 to 5 hours to be reduced. At that time, the volume ratio of nitrogen and hydrogen constituting the reducing atmosphere, it is preferable, is 100%:0% to 80%:20%. At a temperature lower than 800° C. and higher than 1000° C., the optimum reducing reaction cannot occur and heating time smaller than 0.5 hours is not sufficient for the reducing reaction. On the other hand, heating time more than 3 hours is not preferable for reduction efficiency. Also, when the proportion of hydrogen exceeds 20%, the luminous efficiency is decreased because of the excessive reducing atmosphere.

Now, an embodiment of the present invention will be described in detail with reference to the drawings.

First Embodiment

When x=0.98; y=0.05; and z=0.01:

ZnO of 0.98 mole, $Ga_2O_3$ of 0.995 mole, $Al_2O_3$ of 0.05 mole and $MnCl_2$ of 1 m/o (=0.01 mole) dissolved in water is applied to a mortar containing alcohol and mixed for 4 hours and then dried. A quarts tube containing the dried mixture is put in an electrical furnace pre-heated at about 1100° C. for about 6 hours to preparing a compound, and then the compound is powdered. A quartz tube containing the powder is put in an electrical furnace pre-heated at about 900° C. and is heated for an hour in a reducing atmosphere in which the volume ratio of nitrogen and hydrogen is 98%:2%, thereby obtaining a green phosphor.

Second to Fifth Embodiments

When x=0.98; $0.1 \leq y \leq 0.8$; and z=0.01:

In the same condition as the first embodiment except that x, y, z are equal to those of the following table 1, the embodiments are carried out to obtain a green phosphor.

TABLE 1

| embodiment | x | Y | z | ZnO | $Ga_2O_3$ | $Al_2O_3$ | $Mn^{2+}$ |
|---|---|---|---|---|---|---|---|
| 2nd | 0.98 | 0.1 | 0.01 | 0.98 | 0.97 | 0.1 | 0.01 |
| 3rd | 0.98 | 0.15 | 0.01 | 0.98 | 0.945 | 0.15 | 0.01 |
| 4th | 0.98 | 0.4 | 0.01 | 0.98 | 0.82 | 0.4 | 0.01 |
| 5th | 0.98 | 0.8 | 0.01 | 0.98 | 0.62 | 0.8 | 0.01 |

First Comparative Example

When x=0.98; y=0; and z=0.01:

In the same conditions as the first embodiment except that $Ga_2O_3$ of 1.02 mole is used and $Al_2O_3$ is not used, the first comparative example is carried out to obtain a green phosphor.

Figure 2:
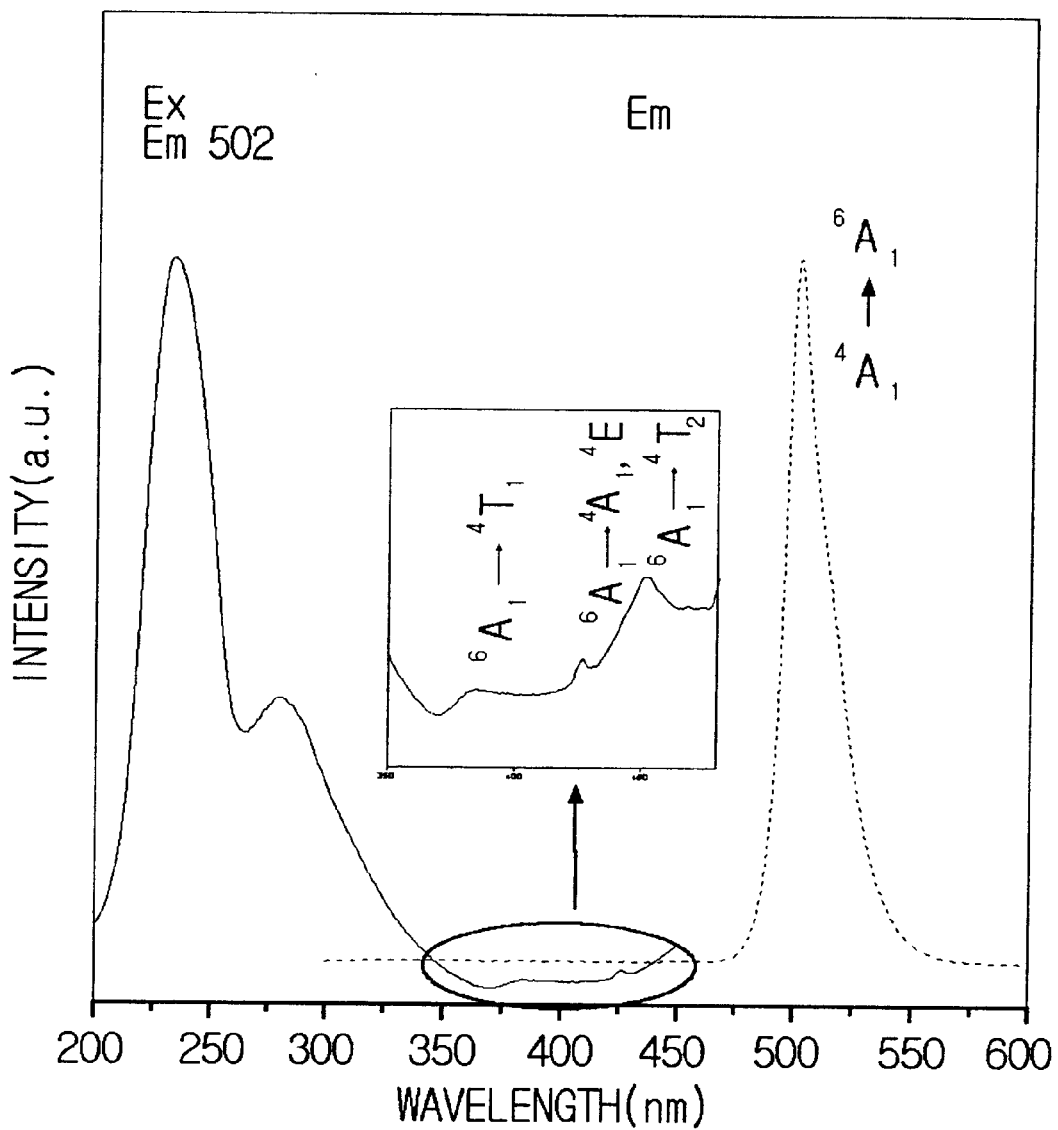
FIG. 2 is a graph illustrating excitation and emission spectrum of photoluminescence (PL) of a phosphor having a composition of $xZnO+(2-x)Ga_2O_3{:}zMn^{2+}$.

FIG. 1 is a graph illustrating change of X ray diffraction pattern in response to change of y, substitution quantity of aluminum, in respective phosphors obtained by the first to fifth embodiments and the first comparative example. In FIG. 2, as y increases, the main phase is changed from $ZnGa_2O_4$ phase to $ZnAl_2O_4$ phase.

Figure 4:
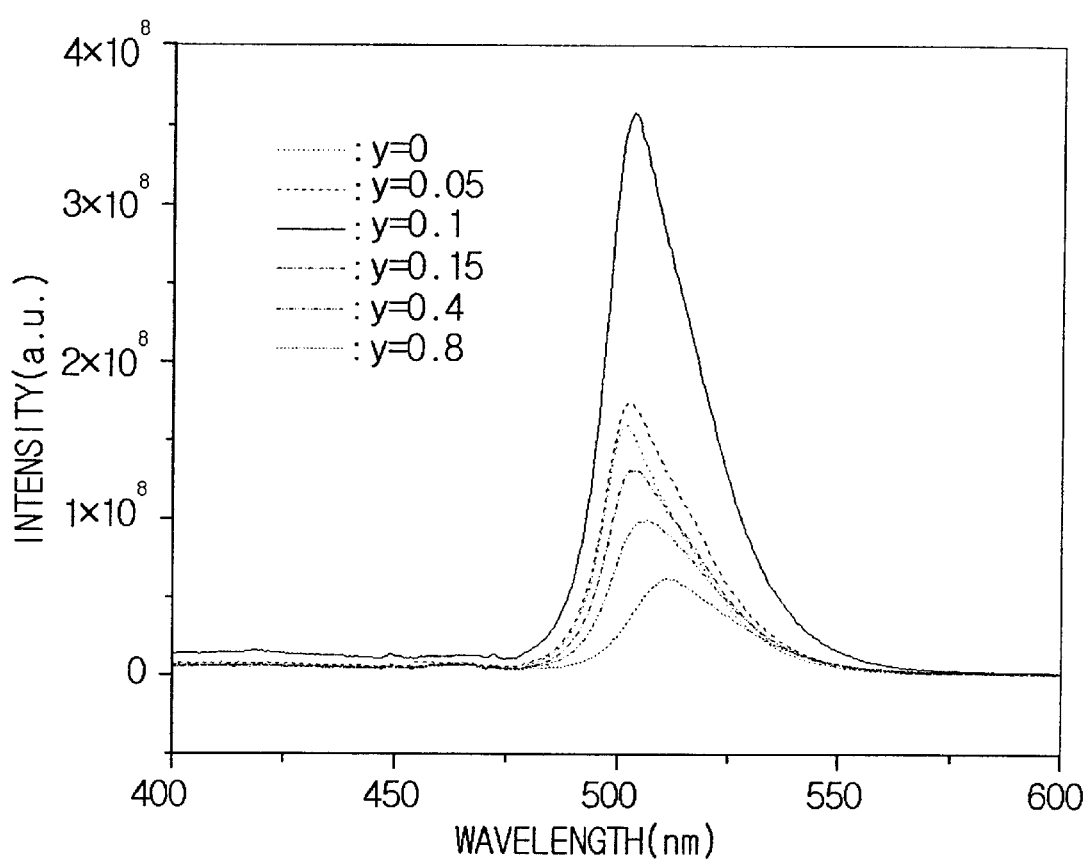
FIG. 4 is a graph illustrating changes of emission spectrum of PL in response to change of y value in a phosphor having a composition of $0.98ZnO+(1.02-y/2)Ga_2O_3+yAl_2O_3$:1 m/o $Mn^{2+}$.

FIG. 4 is a graph illustrating change of PL light emission spectrum in response to change of y in respective phosphors obtained by the first to fifth embodiments and the first comparative example. At that time, when y is within a range of 0 to 0.15, the sample shows a light emission band having a maximum intensity at 502 nm. When y is 0.4, the sample shows a light emission band having a maximum intensity at 505 nm and when y is 0.8, the sample shows a light emission to be maximum at 515 nm. When y is 0.1, it is known that a green phosphor having a maximum light emission intensity can be obtained.

Second Comparative Example

When x=0.98; y=0; and z=0.006:

In the same conditions as the first comparative example except that x, y, z are equal to those of the following table 2, the example is carried out to obtain a green phosphor.

TABLE 2

| comparative | x | Y | z | ZnO | $Ga_2O_3$ | $Al_2O_3$ | $Mn^{2+}$ |
|---|---|---|---|---|---|---|---|
| 2nd | 0.98 | — | 0.006 | 0.98 | 1.02 | — | 0.006 |

FIG. 2 is a graph illustrating excitation spectrum and emission spectrum of PL of a sample of a green phosphor obtained by the second comparative example. In the excitation spectrum, bands of 240 nm, 280 nm, 383 nm, 425 nm and 452 nm are shown. At that time, the band of 240 nm is produced by absorption of the base, $ZnGa_2O_4$, the band of 280 nm is known to be produced by absorption of $Mn^{2+}$ ion, but not clear. Also, bands of 383 nm, 425 nm and 452 nm are produced by absorption of $Mn^{2+}$, respectively. When excited by the respective wavelengths shown in the excitation spectrum, all the bands show a light emission band having a maximum value at 502 nm.

Third to Thirteenth Comparative Examples

When $0.88 \leq x \leq 1.12$; y=0; and z=0.03:

In the same conditions as the first comparative example except that x, y, z are equal to those of the following table 3, the examples are carried out to obtain a green phosphor.

TABLE 3

| comparative | x | y | z | ZnO | $Ga_2O_3$ | $Al_2O_3$ | $Mn^{2+}$ |
|---|---|---|---|---|---|---|---|
| 3rd | 0.88 | — | 0.003 | 0.88 | 1.12 | — | 0.003 |
| 4th | 0.92 | — | 0.003 | 0.92 | 1.08 | — | 0.003 |
| 5th | 0.94 | — | 0.003 | 0.94 | 1.06 | — | 0.003 |
| 6th | 0.96 | — | 0.003 | 0.96 | 1.04 | — | 0.003 |
| 7th | 0.98 | — | 0.003 | 0.98 | 1.02 | — | 0.003 |
| 8th | 1.00 | — | 0.003 | 1.00 | 1.00 | — | 0.003 |
| 9th | 1.02 | — | 0.003 | 1.02 | 0.98 | — | 0.003 |
| 10th | 1.04 | — | 0.003 | 1.04 | 0.96 | — | 0.003 |
| 11th | 1.06 | — | 0.003 | 1.06 | 0.94 | — | 0.003 |
| 12th | 1.08 | — | 0.003 | 1.08 | 0.92 | — | 0.003 |
| 13th | 1.12 | — | 0.003 | 1.12 | 0.88 | — | 0.003 |

Fourteenth to Seventeenth Comparative Examples

When $0.94 \leq x \leq 1.06$; y=0; and z=0.006:

In the same conditions as the first comparative example except that x, y, z are equal to those of the following table 4, the examples are carried out to obtain a green phosphor.

TABLE 4

| comparative | x | Y | z | ZnO | $Ga_2O_3$ | $Al_2O_3$ | $Mn^{2+}$ |
|---|---|---|---|---|---|---|---|
| 14th | 0.94 | — | 0.006 | 0.94 | 1.06 | — | 0.006 |
| 15th | 0.98 | — | 0.006 | 0.98 | 1.02 | — | 0.006 |
| 16th | 1.00 | — | 0.006 | 1.00 | 1.00 | — | 0.006 |
| 17th | 1.06 | — | 0.006 | 1.06 | 0.96 | — | 0.006 |

Eighteenth to Twenty First Comparative Examples

When $0.94 \leq x \leq 1.06$; y=0; and z=0.009:

In the same conditions as the first comparative example except that x, y, z are equal to those of the following table 5, the examples are carried out to obtain a green phosphor.

TABLE 5

| comparative | x | y | z | ZnO | $Ga_2O_3$ | $Al_2O_3$ | $Mn^{2+}$ |
|---|---|---|---|---|---|---|---|
| 18th | 0.94 | — | 0.009 | 0.94 | 1.06 | — | 0.009 |
| 19th | 0.98 | — | 0.009 | 0.98 | 1.02 | — | 0.009 |
| 20th | 1.00 | — | 0.009 | 1.00 | 1.00 | — | 0.009 |
| 21st | 1.06 | — | 0.009 | 1.06 | 0.96 | — | 0.009 |

Figure 3:
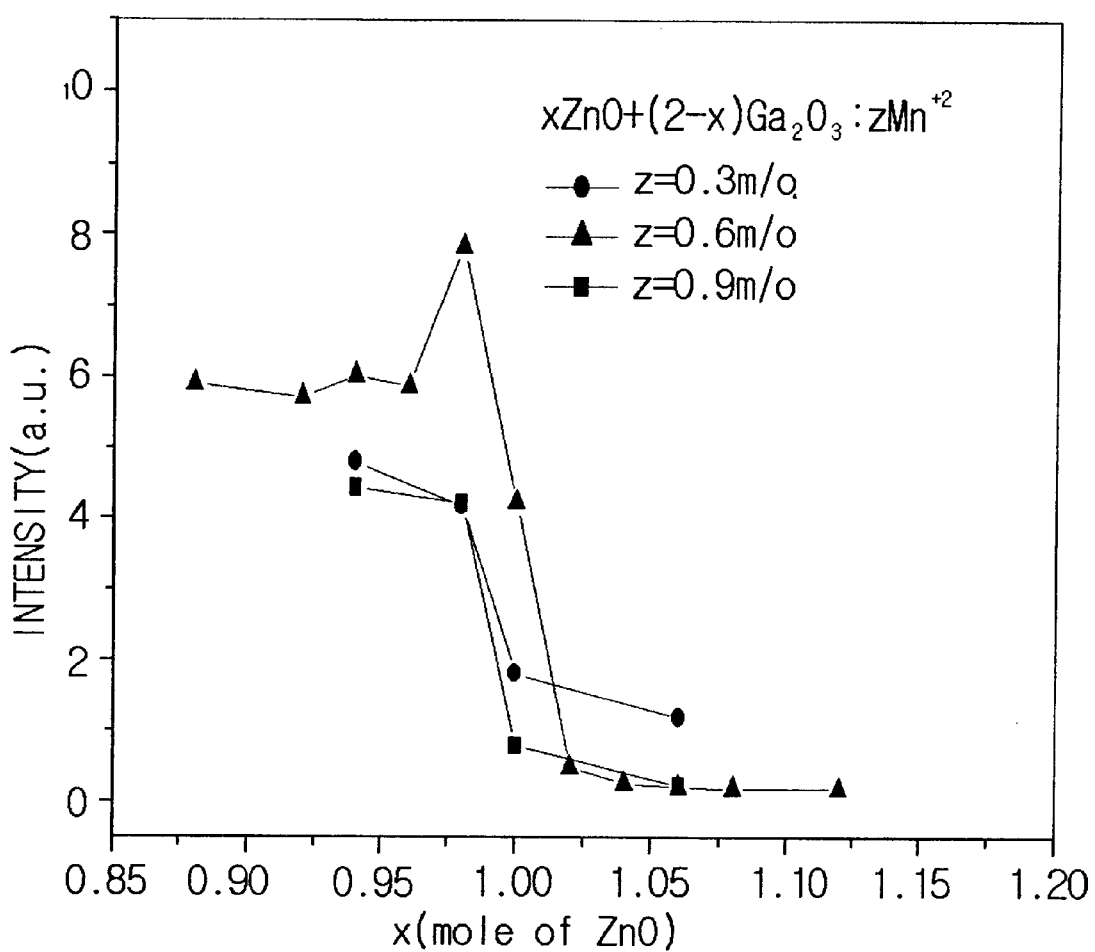
FIG. 3 is a graph illustrating changes of the peak intensity at 502 nm in response to change of x value and z value in a phosphor having a composition of $xZnO+(2-x)Ga_2O_3{:}zMn^{2+}$.

FIG. 3 is a graph illustrating change of light emission characteristic (intensity) in response to change of x and z in the respective phosphors obtained by the third to the twenty-first comparative examples. Regardless of the addition quantities of $Mn^{2+}$, all the samples of the phosphors show a emission band having a maximum intensity at 502 nm. The sample having smaller quantity in ZnO shows larger light emission intensity. When $Mn^{2+}$s of 0.3, 0.9 m/o are added, the sample having x of 0.94 shows a maximum light emission intensity and when $Mn^{2+}$s of 0.6 m/o are added, the sample having x of 0.98 shows a maximum light emission intensity. This means that when ZnO is within a range of $0.88 \leq x \leq 1.0$, the sample shows a most preferable luminous efficiency.

Sixth to Tenth Embodiments

When x=0.98; $0 \leq y \leq 0.8$; and z=0.02:

In the same conditions as the first embodiment except that x, y, z are equal to those of the following table 6, the embodiment is carried out to obtain a green phosphor.

TABLE 6

| comparative | x | y | z | ZnO | $Ga_2O_3$ | $Al_2O_3$ | $Mn^{2+}$ |
|---|---|---|---|---|---|---|---|
| 6th | 0.98 | 0.05 | 0.02 | 0.98 | 0.995 | 0.05 | 0.02 |
| 7th | 0.98 | 0.1 | 0.02 | 0.98 | 0.97 | 0.1 | 0.02 |
| 8th | 0.98 | 0.15 | 0.02 | 0.98 | 0.945 | 0.15 | 0.02 |
| 9th | 0.98 | 0.4 | 0.02 | 0.98 | 0.82 | 0.4 | 0.02 |
| 10th | 0.98 | 0.8 | 0.02 | 0.98 | 0.62 | 0.8 | 0.02 |

Figure 5:
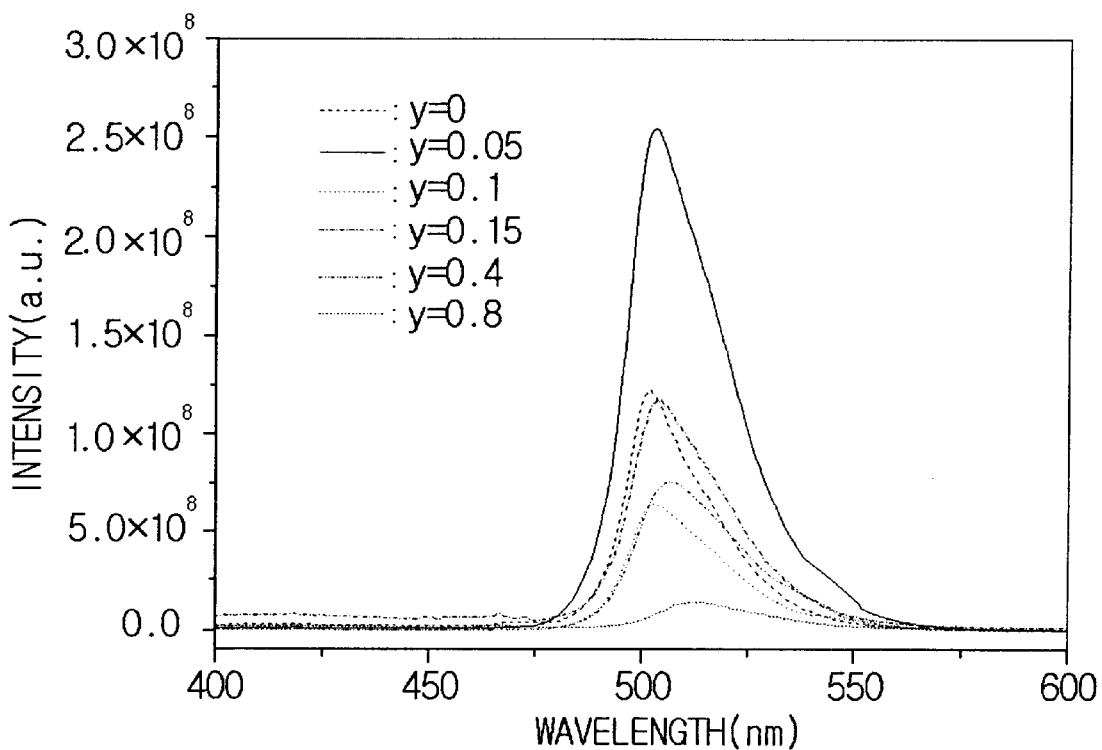
FIG. 5 is a graph illustrating changes of emission spectrum of PL in response to change of y value in a phosphor having a composition of $0.98ZnO+(1.02-y/2)Ga_2O_3+yAl_2O_3$:2 m/o $Mn^{2+}$.

FIG. 5 is a graph illustrating change of PL emission spectrum in response to the change of y, substitution quantity of aluminum, in a green phosphor obtained by the sixth to the tenth embodiments. At that time, when y is within a range of 0 to 0.15, the sample shows a light emission band having a maximum intensity at 502 nm. When y=0.4, the sample shows a light emission band having a maximum intensity at 505 nm and when y=0.8, the sample shows a light emission band having a maximum intensity at 515 nm. It is can be known that when y=0.2, a green phosphor having a largest light emission intensity can be obtained.

Figure 6:
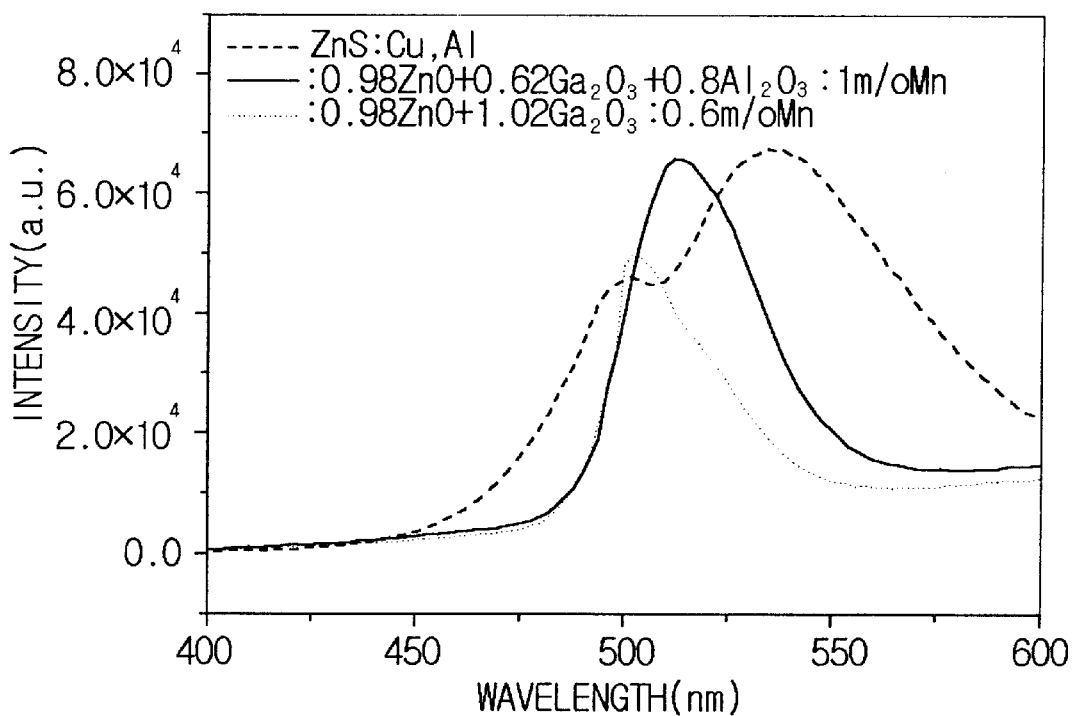
FIG. 6 is a graph illustrating a result of comparison in cathodoluminescence (CL) spectrum of a phosphor having a composition of $0.98ZnO+0.62Ga_2O_3+0.8Al_2O_3$:1 m/o $Mn^{2+}$, a phosphor having a composition of $0.98ZnO+1.02Ga_2O_3$:0.6 m/o $Mn^{2+}$ and a commercially available CRT green phosphor having a composition of ZnS:Cu, Al.

FIG. 6 is a graph illustrating a cathodoluminescence (CL) characteristic of green phosphors obtained by the fifth embodiment and the fifteenth comparative example. It is known that the maximum intensity peaks of all the spectrums are equal to those of PL spectrums. Also, compared with the conventional green phosphor, ZnS:Cu, Al, the green phosphor according to the present invention has a similar light emission intensity and, specifically, has a half width of the peak not more than that in the sulfide-based phosphor, thereby having very high color purity.

The green phosphor according to the present invention is oxide-based phosphor stable with respect to external stimulations such as heating or electron scanning. Therefore, when zinc gallate-based oxide phosphor according to the present invention is applied to the fluorescent display or used in the anode plate of FED phosphor, destruction of the phosphor due to electron scanning for a long time can be prevented not to destroy the vacuum between the anode plate and the cathode plate, thereby holding the performance of the panel for a long time.

Also, the phosphor according to the present invention has a high luminance at low voltage and a single light emission band, and thus its color purity (emission wave length: 502~515 nm) is very excellent. Therefore, the phosphor according to the present invention can be efficiently used in manufacturing the fluorescent display or FED panel having high performance.

Therefore, by using the phosphor according to the present invention in manufacturing the fluorescent display, the fluorescent display having an excellent performance such as high luminance, high contrast and the like can be provided. Also, the phosphor according to the present invention is expected to contribute to the common use of low voltage FED.

Although technical spirits of the present invention has been disclosed in conjunction with the appended drawings and the preferred embodiments of the present invention corresponding to the drawings has been described, descriptions in the present specification are only for illustrative purpose, not for limiting the present invention.

Also, those who are skilled in the art will appreciate that various modifications, additions and substitutions are possible without departing from the scope and spirit of the present invention. Therefore, it should be understood that the present invention is limited only to the accompanying claims and the equivalents thereof, and includes the aforementioned modifications, additions and substitutions.

What is claimed is:

1. A green phosphor for fluorescent display having a composition represented by a chemical formula:

$$x\text{ZnO} + (2-x-y/2)\text{Ga}_2\text{O}_3 + y\text{Al}_2\text{O}_3 : z\text{Mn}^{2+}$$

where $0.8 \leq x < 1.0$; $0 < y \leq 0.8$, and $0 < z \leq 0.1$,
wherein a part of gallium in nonstoichiometric zinc gallate base is substituted for aluminum and $\text{Mn}^{2+}$ is added to the zinc gallate base.

2. A method of manufacturing a green phosphor for fluorescent display having a composition represented by a chemical formula:

$$x\text{ZnO} + (2-x-y/2)\text{Ga}_2\text{O}_3 + y\text{Al}_2\text{O}_3 : z\text{Mn}^{2+}$$

where $0.8 \leq x < 1.0$; $0 < y \leq 0.8$, and $0 < z \leq 0.1$
the method comprising the steps of:
preparing a mixture by mixing uniformly zinc oxide, gallium oxide, aluminum oxide, alcohol and either an aqueous solution of manganese salt or an aqueous suspension of manganese oxide;
preparing a compound by heating said mixture; and
reducing said compound by re-heating said compound in a reducing atmosphere.

3. The method of manufacturing a green phosphor for fluorescent display according to claim 2, wherein ZnO is used as said zinc oxide, $\text{Ga}_2\text{O}_3$ is used as said gallium oxide, $\text{Al}_2\text{O}_3$ is used as said aluminum oxide, MnO or $\text{MnO}_2$ is used as said manganese oxide, and $\text{MnCl}_2$ is used as said manganese salt.

4. The method of manufacturing a green phosphor for fluorescent display according to claim 2, wherein said step of preparing a compound is performed by heating said mixture at a temperature of 1000° to 1300° for 4 to 10 hours, and wherein said step of reducing said compound is performed by re-heating said compound in the reducing atmosphere in which a volume ratio of nitrogen and hydrogen is within a range of 100%:0% to 80%:20%, at a temperature of 900° to 1000° for 0.5 to 5 hours.

5. The method of manufacturing a green phosphor for fluorescent display according to claim 2, wherein in said step of preparing a mixture, said mixture has an element ratio of zinc and gallium smaller than 1:2 and 0.05 to 0.15 m/o of $\text{Mn}^{2+}$, wherein said step of preparing a compound is performed by heating said mixture at a temperature of 1100° to 1300° for not more than 10 hours, and wherein said step of reducing said compound is performed by re-heating said compound in the reducing atmosphere in which a volume ratio of nitrogen and hydrogen is not more than 100:5, at a temperature of 900° C. to 1000° C. for about 3 hours.

* * * * *